US012712287B2

(12) United States Patent
Naragani et al.

(10) Patent No.: US 12,712,287 B2
(45) Date of Patent: Aug. 18, 2026

(54) LOW BAND DIPOLE FOR HIGH DENSITY MULTIBAND ANTENNAS

(71) Applicant: JOHN MEZZALINGUA ASSOCIATES, LLC, Liverpool, NY (US)

(72) Inventors: Lenin Naragani, Hyderabad (IN); Lakshminarayana Pollayi, Srikakulam District (IN); Podili Suvarna Raju, Vijayawada Krishna District (IN); Ravi Kumar Muthyala, Vishakapatnam (IN); Ravi N B Keerthi, Mandya (IN)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

(21) Appl. No.: 19/155,827

(22) PCT Filed: Mar. 15, 2023

(86) PCT No.: PCT/US2023/015288

§ 371 (c)(1),
(2) Date: Aug. 12, 2025

(87) PCT Pub. No.: WO2024/191423

PCT Pub. Date: Sep. 19, 2024

(65) Prior Publication Data

US 2026/0112816 A1 Apr. 23, 2026

(51) Int. Cl.

*H01Q 21/26* (2006.01)
*H01Q 9/28* (2006.01)
*H01Q 5/48* (2015.01)

(52) U.S. Cl.
CPC ............... *H01Q 21/26* (2013.01); *H01Q 9/28* (2013.01); *H01Q 5/48* (2015.01)

(58) Field of Classification Search
CPC ............. H01Q 5/48; H01Q 9/28; H01Q 21/26
See application file for complete search history.

(56) References Cited

U.S. PATENT DOCUMENTS

2020/0067205 A1 2/2020 Segador et al.
2020/0328533 A1 10/2020 Sundararajan et al.
(Continued)

FOREIGN PATENT DOCUMENTS

CN 206461087 U 9/2017
CN 111509402 A 8/2020

OTHER PUBLICATIONS

International Searching Authority; International Application No. PCT/US2023/015288; Dated: Dec. 11, 2023; 6 pages.
(Continued)

*Primary Examiner* — Daniel Munoz
(74) *Attorney, Agent, or Firm* — Barclay Damon LLP

(57) ABSTRACT

A low band dipole assembly has four dipole arms. Each of the dipole arms has an upper body, a plurality of cloaking tabs that protrude downward from either side of the upper body, and an end tab that extends downward from the upper body. Each of the dipole arms also has two mounting tabs that extend laterally from the dipole arm. The upper body has a plurality of cloaking slots, which provide for capacitive and inductive cloaking. Each of the four dipole arms may be formed of a single piece of sheet metal, such as aluminum. Each of the four dipole arms is configured to be transparent to RF (Radio Frequency) energy in the C-Band or Mid Band frequencies.

6 Claims, 6 Drawing Sheets

(56) References Cited

U.S. PATENT DOCUMENTS

| | | | |
|---|---|---|---|
| 2020/0335881 | A1 | 10/2020 | Le |
| 2020/0373671 | A1* | 11/2020 | Li ........................ H01Q 19/108 |
| 2022/0037804 | A1 | 2/2022 | Sundararajan et al. |
| 2022/0190470 | A1* | 6/2022 | Wu ........................ H01Q 1/521 |
| 2023/0017375 | A1 | 1/2023 | Wu et al. |

OTHER PUBLICATIONS

International Bureau; International Preliminary Report on Patentability; International Application No. PCT/US2023/015288; Date of Mailing Sep. 25, 2025; 5 pages.
Canadian Intellectual Property Office; Canadian Application No. 3,282,913; Date of Notification: Nov. 20, 2025; 8 pages.

* cited by examiner

LOW BAND DIPOLE FOR HIGH DENSITY MULTIBAND ANTENNAS

CROSS-REFERENCE TO RELATED APPLICATIONS

This application is based upon and claims priority to, under relevant sections of 35 U.S. C. § 119, PCT Application No.: PCT/US2023/015288, filed Mar. 15, 2023, the entire contents of which are hereby incorporated by reference.

FIELD OF THE INVENTION

The present invention relates to wireless communications, and more particularly, to multiband cellular antennas.

RELATED ART

The proliferation of numerous new frequency bands in cellular communications has increased demand for antennas that operate in multiple bands. Further, the proliferation of small cell antenna deployments in dense urban settings has increased pressure on antenna designers to make small cell antennas as compact as possible while providing multiband capability. These opposing design pressures require antenna designers to place antenna dipoles of different frequency bands in closer proximity to each other within a radome of minimal dimensions to mitigate wind loading. Placing dipoles of different frequency bands in close proximity to each other exacerbates inter-band interference and re-radiation, which degrades antenna performance.

LB dipoles, being the largest of the dipoles within a multiband antenna, suffer the most from inter-band interference because they are the largest, and densifying multiband antenna dipole layouts require that the arms of LB dipoles extend over and overlap with dipoles covering other frequency ranges such as mid band (MB)(1695-2690 MHz), C-Band and CBRS (Citizens Broadband Radio Service)(3.4-4.2 GHz). Conventional cloaking techniques exist to mitigate LB dipole coupling and re-radiation with these other frequency bands, but there are limits to the effectiveness of conventional techniques. Further, being the largest, LB dipoles suffer most from design constraints such as radome dimensions.

Accordingly, what is needed is a LB dipole design that is effectively transparent in the MB, C-Band and CBRS frequency ranges, and that may be located in close proximity to these other band dipoles to meet antenna densification demands.

SUMMARY OF THE DISCLOSURE

An aspect of the present disclosure involves a dipole assembly. The dipole assembly comprises a support pedestal; a balun feed PCB (Printed Circuit Board) structure; four dipole arms configured to radiate in a first frequency band, the four dipole arms arranged in a cross configuration, each of the four dipole arms having an upper body having a plurality of cloaking slots, wherein the upper body is coupled to a plurality of downward-pointing cloaking tabs disposed on either side of the upper body, the wherein the upper body has an outer end tab disposed at an outer end of the upper body, the outer end tab pointing downward, and wherein each of the four dipole arms has two mounting tabs, one disposed on each side, wherein each of the four dipole arms is mechanically coupled to the support pedestal and the balun feed PCB, and wherein each of the four dipole arms is electrically coupled to a corresponding signal trace on the balun feed PCB structure; and a director mechanically coupled to the support pedestal and disposed above the four dipole arms.

DESCRIPTION OF EXEMPLARY EMBODIMENTS

Figure 1A:
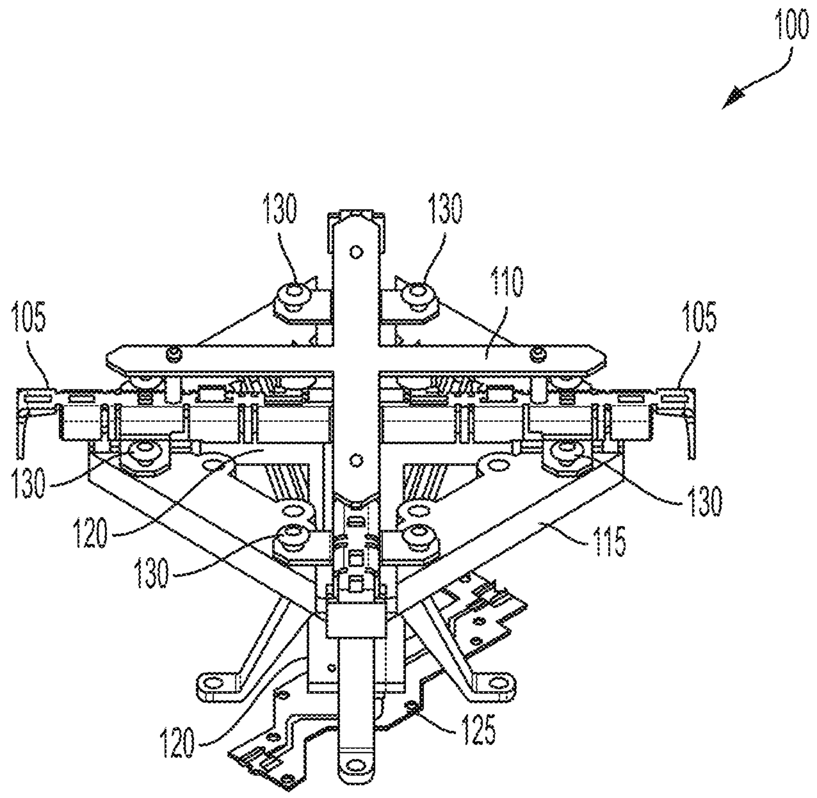
FIG. 1 A illustrates an exemplary low band (LB) dipole according to the disclosure, mounted on a support pedestal with a passive radiator in a full assembly.
FIG. 1B is a side view of the LB radiator assembly of FIG. 1A.
FIG. 1C is a top view of the LB radiator assembly of FIG. 1A.

FIG. 1A illustrates an exemplary LB dipole assembly 100 according to the disclosure. LB dipole assembly 105 has four LB dipole arms 105 that are mounted in a cross configuration on a support pedestal 115. Mounted above the four LB dipole arms 105 is a director (or passive radiator) 110. Each of the four LB dipole arms 105 are mechanically coupled to a balun feed PCB (Printed Circuit Board) 120 structure that electrically couples each of the four LB dipole arms 105 to corresponding balun feed lines and ground lines (not shown) that in turn are couped to appropriate signal traces on an RF signal feed board 125. As used herein, "electrically couples" may mean either a direct electrical coupling or a capacitive coupling. LB dipole arms 105 are mounted to support pedestal 115 via two mounting screws 130, one disposed on each side of a given LB dipole arm 105.

Figure 1C:
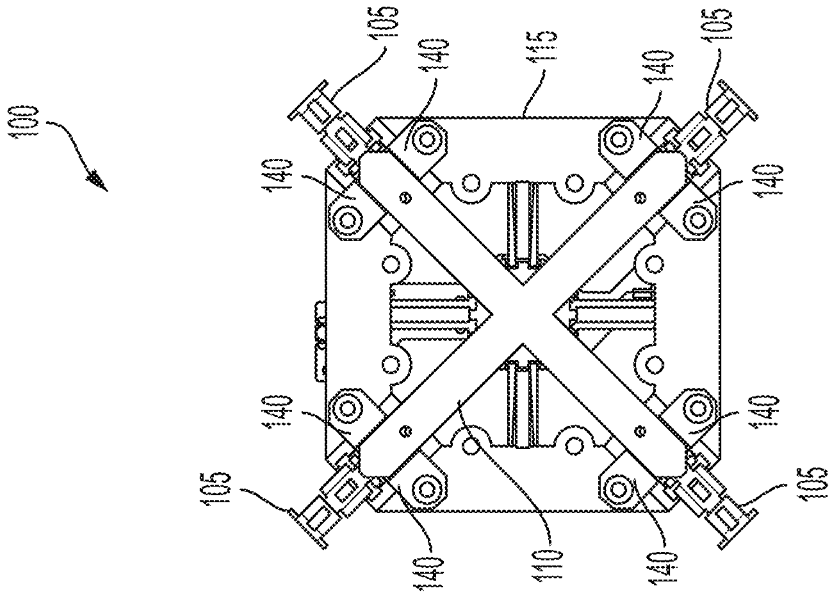
Figure 1B:
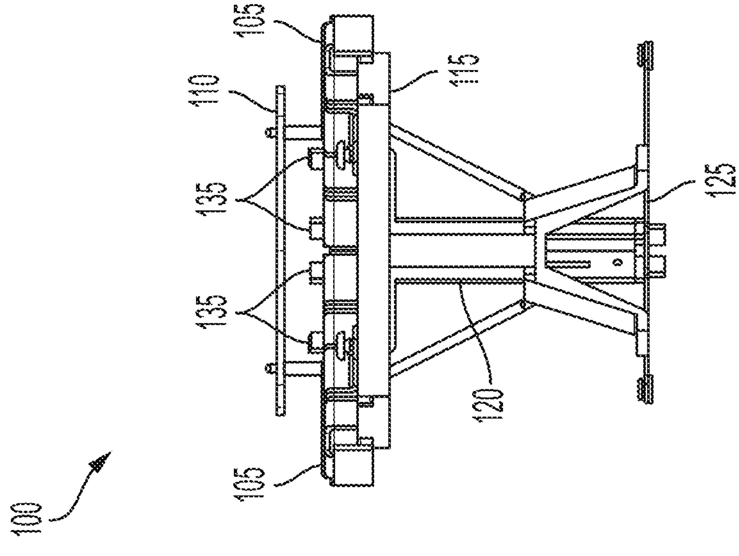

FIG. 1B is a side view of exemplary LB dipole assembly 100, showing LB dipole arms 105 mounted on support pedestal 115 via mounting screws 130, and director 110 mounted above LB dipole arms 105. Also shown are coupling tabs 135 that are components of balun feed PCB structure 120.

FIG. 1C is a top-down view of exemplary LB dipole assembly 100. Shown are director 110 and the ends of each LB dipole arm 105 that extend beyond director 110. Also visible are LB dipole arm mounting tabs 140 that mechanically couple its corresponding LB dipole arm 105 to support pedestal 115 via mounting screws 130.

Figure 2:
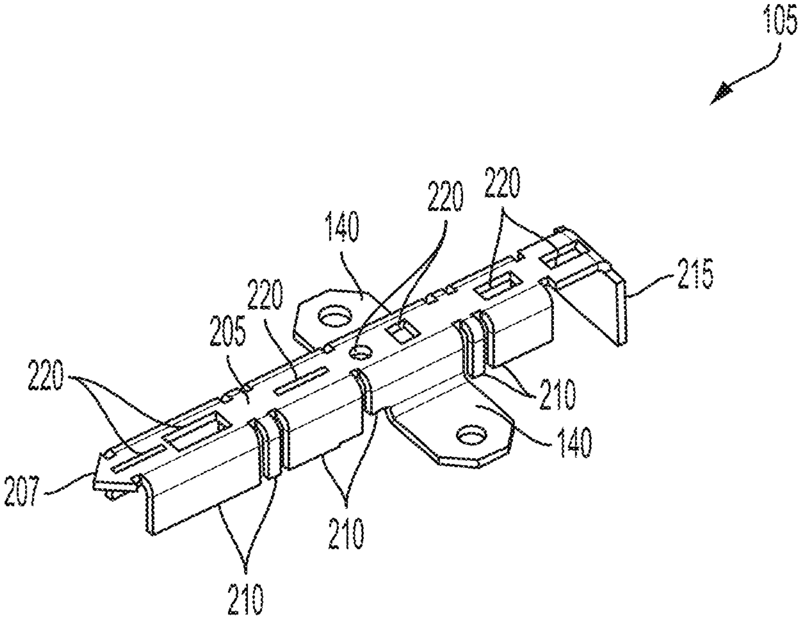
FIG. 2 illustrates an exemplary LB dipole arm according to the disclosure.

FIG. 2 illustrates an exemplary LB dipole arm 105 according to the disclosure. LB dipole arm 105 has an upper arm body 205 that has an inner end 207 and an outer end having an outer end tab 215. Inner end 207 has an arrow-like shape that allows LB dipole arm 105 to be mounted in a cross configuration such that the inner ends 207 of the four LB dipole arms 105 are in close proximity to each other such that the two LB dipole arms that radiate in one of the two polarization states are pointed toward each other. Outer end tab 215 is disposed on the outer end of upper body 205, extending outward from LB dipole assembly 100 such that it may be disposed over and overlapping with an adjacent C-Band or Mid Band (MB) dipole (not shown). Further, outer end tab 215 may point downward from upper body 205 and may be wider, extending laterally beyond upper body 205. Upper body 205 may have a plurality of cloaking slots 220, which are designed to prevent resonance with RF energy emitted in C-Band of MB frequencies by respective C-Band or MB dipoles (not shown) that may be in close proximity to LB dipole assembly 100. In preventing resonance with C-Band and MB frequencies, LB dipole arm 105 may become transparent to those frequencies and may thus not cause interference, such as cross polarization with nearby C-Band or MB dipoles.

LB dipole arm 105 may be formed of aluminum or other sheet metal.

LB dipole arm 105 has a plurality of cloaking tabs 210 that extend downward from both lateral edges of upper body 205. Each cloaking tab 210 has a length along upper body 205 that renders it transparent to MB or C-Band radiation, while providing additional volume to LB dipole arm 105 to increase its bandwidth. The cloaking tabs 210 are spaced apart and arranged to provide both capacitive and inductive cloaking. Two of the cloaking tabs 210 disposed on opposite sides of upper body 205 may have mounting tab 140 integral thereto and extending laterally.

Outer end tab 215 extends downward from the end of upper body 205. The additional mass of the downward-extending tab increases the volume of LB dipole arm 105 while not increasing the surface area of LB dipole arm as it shadows over an adjacent C-Band or MB dipole (not shown).

Figure 3:
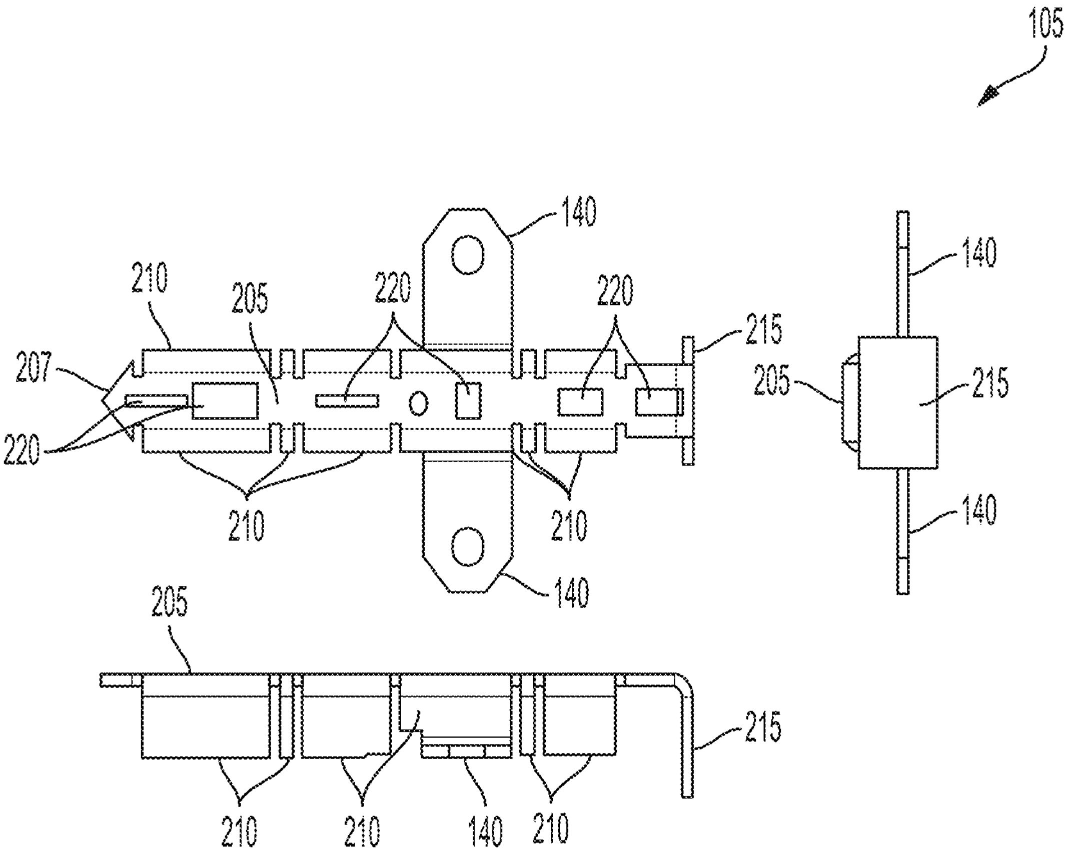
FIG. 3 provides three views of the exemplary LB dipole arm of FIG. 2.

FIG. 3 provides a top-down view, side view, and view from outer end 215.

Figure 4:
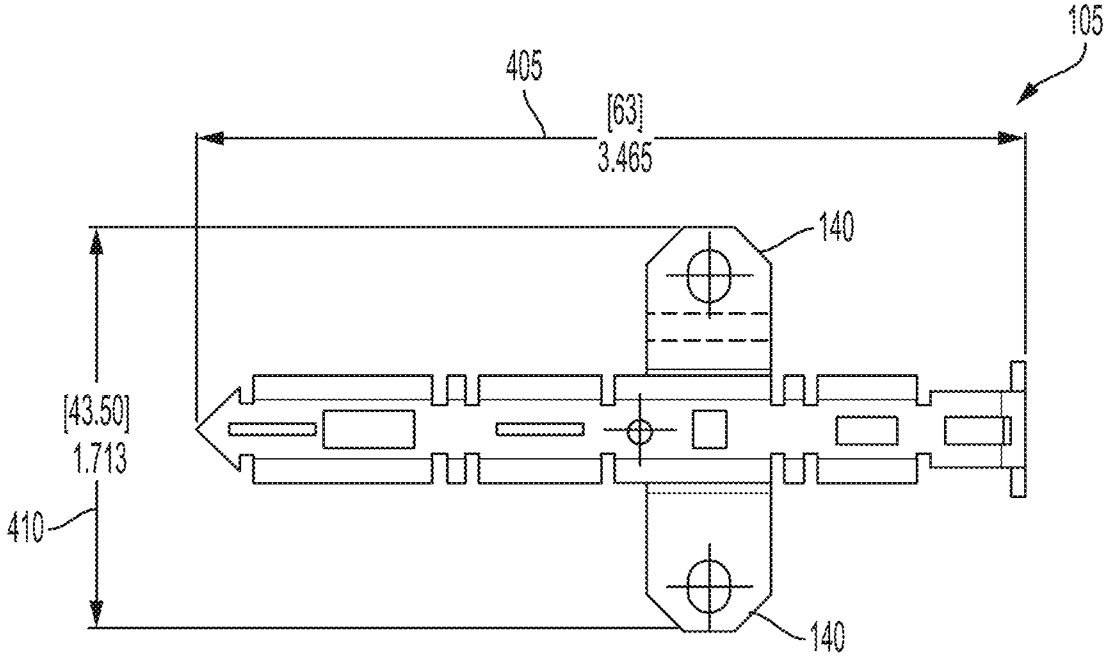
FIG. 4 is a top-down view of the exemplary LB dipole arm of FIG. 2, providing exemplary dimensions.
Figure 5:
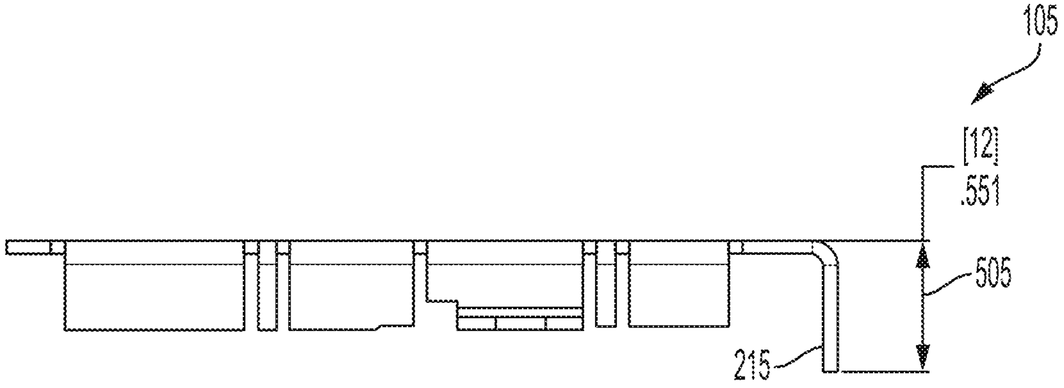
FIG. 5 is a side view of the exemplary LB dipole arm of FIG. 2, providing additional dimensions.

FIG. 4 illustrates two example dimensions of exemplary LB dipole arm 105: length 405, which may be 88 mm; and width 410, which may be 43.5 mm.

Variations to LB dipole assembly 100 are possible. For example, director 110 may have a different shape from that illustrated, such as a square or disk shape.

What is claimed is:

1. A dipole assembly for a multi-band antenna, comprising:

a support pedestal;

a balun feed PCB (Printed Circuit Board) structure;

four dipole arms configured to radiate in a first frequency band, the four dipole arms arranged in a cross configuration, each of the four dipole arms having an upper body having a plurality of cloaking slots, wherein the upper body is coupled to a plurality of downward-pointing cloaking tabs disposed on either side of the upper body, the wherein the upper body has an outer end tab disposed at an outer end of the upper body, the outer end tab pointing downward, and wherein each of the four dipole arms has two mounting tabs, one disposed on each side, wherein each of the four dipole arms is mechanically coupled to the support pedestal and the balun feed PCB, and wherein each of the four dipole arms is electrically coupled to a corresponding signal trace on the balun feed PCB structure; and a director mechanically coupled to the support pedestal and disposed above the four dipole arms.

2. The dipole assembly of claim 1, wherein each of the four dipole arms is formed of a single piece of sheet metal.

3. The dipole assembly of claim 2, wherein the sheet metal comprises aluminum.

4. The dipole assembly of claim 1, wherein the outer end tab extends laterally beyond the upper body.

5. The dipole assembly of claim 1, wherein the mounting tabs extend laterally from the corresponding dipole arm.

6. The dipole assembly of claim 5, wherein the mounting tabs extend laterally from a corresponding cloaking tab.

* * * * *